United States Patent [19]
Hilado

[11] 3,899,939
[45] Aug. 19, 1975

[54] SELF-LOCKING DIFFERENTIAL FOR MOTOR VEHICLES

[76] Inventor: Alfonso Hilado, P.O. Box 3130, Manila, Philippines

[22] Filed: Dec. 18, 1972

[21] Appl. No.: 316,241

[52] U.S. Cl. .................................. 74/715; 74/424.5
[51] Int. Cl. ......................... F16h 1/38; F16h 1/20
[58] Field of Search ........................... 74/715, 424.5

[56] References Cited
UNITED STATES PATENTS

| | | | |
|---|---|---|---|
| 2,000,223 | 5/1935 | L Du Pras | 74/715 |
| 2,462,000 | 2/1949 | Randall | 74/715 |
| 3,095,761 | 7/1963 | Hilado | 74/715 |
| 3,343,429 | 9/1967 | Frost | 74/715 |

*Primary Examiner*—Samuel Scott
*Assistant Examiner*—P. S. Lall

[57] ABSTRACT

A self-locking differential employing helical gears. This improved self-locking or limited slip differential consists essentially of two abutting central helical gears or worms inside a differential box or carrier. The central helical gears or worms are connected to the rear axle shafts on both sides of the vehicle by means of fluted or splined sleeves.

5 Claims, 5 Drawing Figures

PATENTED AUG 19 1975  3,899,939

SELF-LOCKING DIFFERENTIAL FOR MOTOR VEHICLES

The invention relates to an improvement in what is commonly known as a differential gear assembly usually employed in the power transmission systems of automotive land vehicles between the prime mover and the oppositely disposed vehicle-driving traction wheels and which allows for differential movement of the driving traction wheels on opposite sides of the vehicle particularly when said vehicle is moving in an arcuate or circular path.

Since the advent of automotive land vehicles, generally known as "automobiles," a differential mechanism has been employed and a United States Letters Patent No. 3,095,761, on an application dated Mar. 18, 1960, was issued on July 2, 1963 for a self-locking differential mechanism of which the present application for patent is for an improvement thereof.

The object of the present improvement is to further simplify the mechanism by removing the integral spur gears attached to planetary worms and substituting for them adequately disposed likewise helical gears or worms of proper configuration.

In the drawings, which form part of this specification by reference and which illustrate the presently preferred form of the invention.

Figure 4:
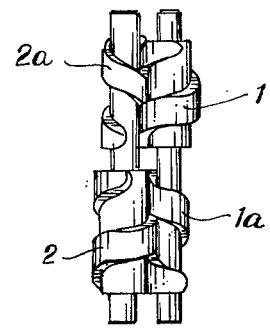
Figure 3A:
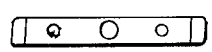
FIG. 3 is a front view and FIG. 3A is a side view showing only the center bearing marked 3 in FIG. 1.
Figure 2:
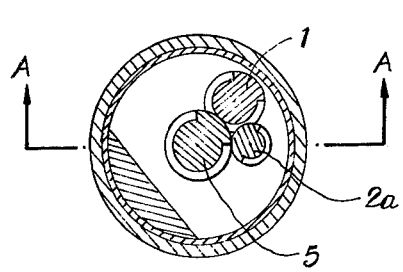
FIG. 2 is a cross-sectional view of the same as viewed at the section lines BB as shown in FIG. 1.
Figure 3:
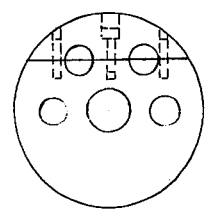

FIG. 4 is a side view at right angles with FIG. 2 showing only the planetary worms 1–1a and 2–2a as indicated in FIG. 2 as 1 and 2a respectively.

Figure 1:
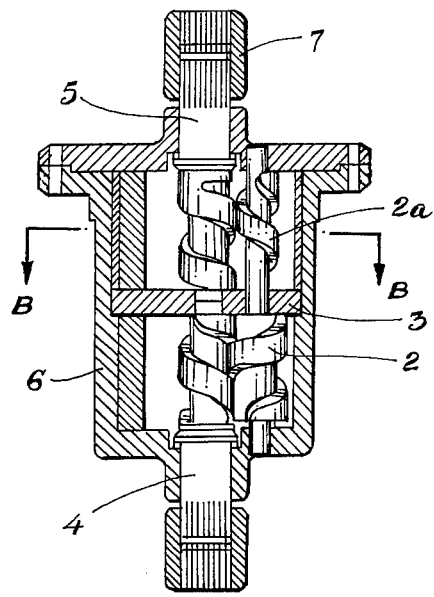
FIG. 1 is a sectional side view of the box or casing of the complete differential as viewed from one side at section lines AA as shown in FIG. 2 with the worms in full view.

This improved self-locking or limited slip differential mechanism depending on the slops of the helix angle of the worms, consists essentially of two abutting central helical gears or worms 4 & 5 (FIG. 1), inside the differential box or carrier 6. These central helical gears or worms are connected to the rear axle shafts on both sides of the vehicle by means of fluted or splined sleeves 7 & 8 into which the fluted or splined ends of the axle shafts are inserted.

Meshing with central worm 4 is planetary worm 2–2a (FIG. 1 & 4), and meshing with central worm or helical gear or screw 5 is another planetary helical gear or screw 1–1a, both planetary helical gears or screws being carried by the differential box 6 through properly located trunnions or pins and constrained from longitudinal motion along their axes. Planetary helical gear 1a is integral in one and the same piece of material with a larger planetary helical gear 1 (FIG. 4) which meshes with helical gear or worm 2a previously mentioned and said helical gear 2a is also integral on the same piece of material with a larger worm of helical gear 2 which, in turn meshes with helical gear 1–a and also with helical gear 4 (FIG. 1) also previously mentioned. The two sections of planetary worm 1–1a are threaded in opposite directions, one is left handed and the other right handed and so are the two sections of helical gears 2–2a in such a way that portion 1 meshes with portion 2a and also portion 2 meshes with portion 1a.

The central helical gears 4 & 5 are threaded in the same direction either both left handed or both right handed in such a way that helical gear or worm 5 meshes with portion 1 of planetary worm 1–1a as central helical worm 4 meshes with portion 2 of planetary worm 2–2a but portions 2a & 1a of the planetary worms are of smaller diameter in order to clear the central worms 5 & 4, respectively.

The operation of this locking or limited slip differential is based on the fact that central worm 5 is of slightly bigger diameter than portion 1 of planetary worm 1–1a with which it mewhes, while central worm 4 is also slightly bigger in diameter than portion 2 of planetary worm 2–2a with which is meshes. The amount by which the diameter of central worm 5 is bigger than portion 1 of planetary worm 1–1a and the amount by which the diameter of central worm 4 is bigger than the diameter of portion 2 of planetary worm 2–2a is to be determined experimentally in order to be within the range that the coefficient of sliding friction between the helical threads at their points of contact shall be adequate for the materials and lubricating and other operating condition obtaining in a given case, such that the bigger worm would be able to drive the smaller worm but the latter would not be able to drive or else would drive with a limited slip the bigger worm. This is so because the points of contact of the meshing worms would be moving at different linear velocities, the point of contact of the larger worm would travel faster than the point of contact of the smaller worm although both worms are turning with equal angular velocities with the result that the bigger worm would be able to drive the smaller worm while the smaller worm would not be able to drive or else would drive with a limited slip the bigger worm depending on the coefficient of sliding fraction between them so that if the motion is transmitted from the bigger to the smaller worm the mechanism will operate but not so or else will operate with a limited slip only if the motion is transmitted from the smaller worm to the bigger worm in which case no motion or else a limited slip motion only can take place and the mechanism is either locked or else drive with a limited slip if the lead angles or helix angles or angle of repose is less or more than the angle whose tangent determines the coefficient of sliding fraction between them.

The actual operation of this mechanism in a vehicle is that the differential box or carrier 6 is driven by an engine of the vehicle through suitable transmission mechanisms (not shown in the drawings) and the two driving wheels of the vehicle (also not shown) are in turn driven by the differential box or carrier 6 through central worms 4 & 5 which are splined to the wheel axles through splined bushings 7 & 8. As long as the driving wheels have good traction on the road and the vehicle is travelling along a straight line, no relative motion takes place within the differential box or carrier 6 and the two driving axles on both sides of the vehicle are moving in unison as if they were connected by a solid piece instead of the differential. When the vehicle, however, turns a corner or a curve, the traction of the road constrains the wheel travelling on the inside of the curve to travel slower than the wheel travelling on the outside of the curve and, relatively to the differential box or carrier 6, which is kinematically midway between the two driving wheels and turns at the average speed of the two driving wheels, these wheels are turned in opposite directions at equal speeds by outside forces and these motions are precisely the motions necessary to prevent the locking or limited slip feature of the mechanism to take effect, as, in this case, no driving effort is transferred from one side to the other. Should, however, one driving wheel lose its traction on the ground because of mud, snow, or any other kind of slippery contact, then the result of the driving effort of the engine through the differential box or carrier 6 and the traction of the ground on the wheel which is not slipping is the same as if one side of the differential is being turned to drive the other side and this effort locks the differential or else drives it with limited slip with the result that the driving effort of the engine is transmitted to the wheel with good traction and the vehicle continues to travel inspite of the slipping of the other wheel, and thus automatically preventing the vehicle from stalling which would be the case if the differential were of the ordinary non-locking type.

The advantage of this improved design over the one in U.S. Pat. No. 3,095,761 of July 2, 1963, is that only one pair of planetary worms 1–1a and 2–2a performs the purpose of two pairs of planetary worms in the previous design and also the improved design eliminates the spur gears that where integral with the planetary worms in the original design.

Having described the invention and manner in which the mechanism is to perform, it is obvious to those skilled in the art that certain changes and modifications may be made therein; and, therefore, it is to be understood that the invention is not to be limited to the exact construction herein shown and described but shall include all modifications and changes that fall within the spirit and scope of the appended claims.

That which is claimed as new is:

1. In a differential mechanism, a rotatable gearing box or carrier, drivable members extending from opposite ends of said carrier, a worm element splined to each member respectively and lying within said carrier, each worm element abutting with the opposite element having spiral threads thereon, mating planetary worm of two portions with different diameters journaled in said carrier, a corresponding identical planetary worm oppositely positioned and meshing with it and each planetary worm meshing with the corresponding worm element, one portion of a planetary worm being left handed and the other portion right handed, and one worm element slightly larger in diameter than is called for by the ratio of revolutions between it and the meshing planetary worm, the whole mechanism being constrained from moving longitudinally along their axes.

2. In a differential mechanism, a rotatable gearing box or carrier, drivable members extending from opposite ends of said carrier, a worm element splined to each member respectively with worm threads wound in the same directions, either both right handed or both left handed in the two worm elements, mating planetary worms, the whole mechanism being constrained from moving longitudinally along their axes.

3. In a differential mechanism, a rotatable gearing box or carrier, worm elements splined to two drivable members extending from opposite ends of said carrier, said worm elements mating planetary worms of two portions with different diameters, the bigger portions meshing with the worm elements splined to the drivable members and the smaller portions clear from the opposite worm element, while both planetary worms mesh with each other, the bigger portion of one with the smaller portion of the other, the whole mechanism being constrained from moving longitudinally.

4. In a differential mechanism, a rotatable gearing box or carrier, drivable members extending from opposite ends of said carrier splined to worm elements which mesh with the bigger portions of planetary worms although in the clear from the smaller portions of said planetary worms while both planetary worms mesh with each other.

5. In a differential mechanism, a rotatable gearing box or carrier, drivable members extending from opposite ends of said carrier, splined to worm elements meshing with the bigger portions of planetary worms, the helix angles of both central worm elements and planetary worms being at such slant as convenient so as to produce a locking effect or else a driving effect with limited slip when a smaller worm tends to drive a bigger worm by making the helix angles either smaller or larger respectively, than the angles whose tangent is the coefficient of sliding friction between the worm threads obtaining with the employed materials and the lubricating and other conditions obtaining in any given case.

* * * * *